Feb. 18, 1936. D. L. LEA 2,030,925
PORTABLE TRUCK
Filed Jan. 2, 1935 2 Sheets-Sheet 1
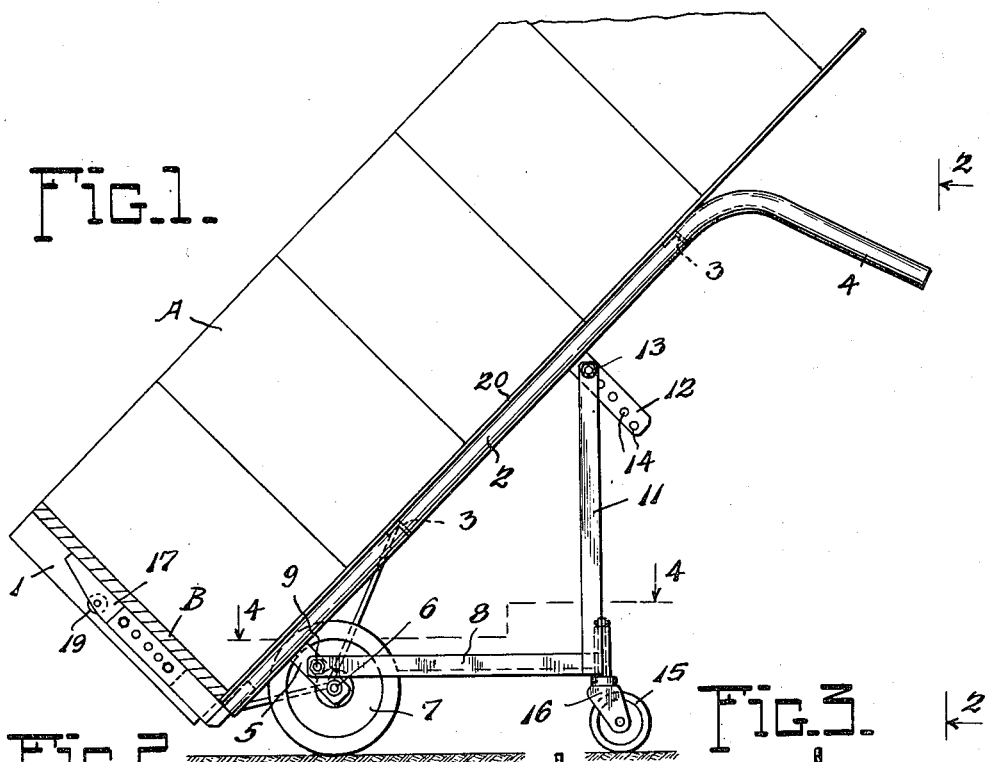
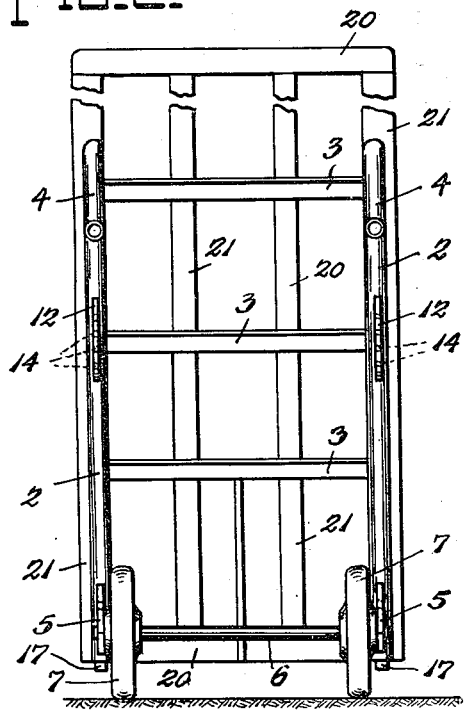
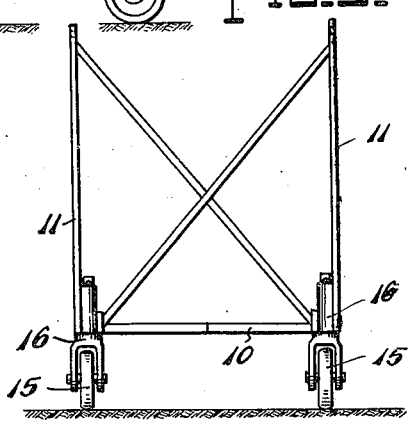
INVENTOR
DUDLEY L. LEA.
BY
ATTORNEYS Feb. 18, 1936.  D. L. LEA  2,030,925
PORTABLE TRUCK
Filed Jan. 2, 1935  2 Sheets-Sheet 2
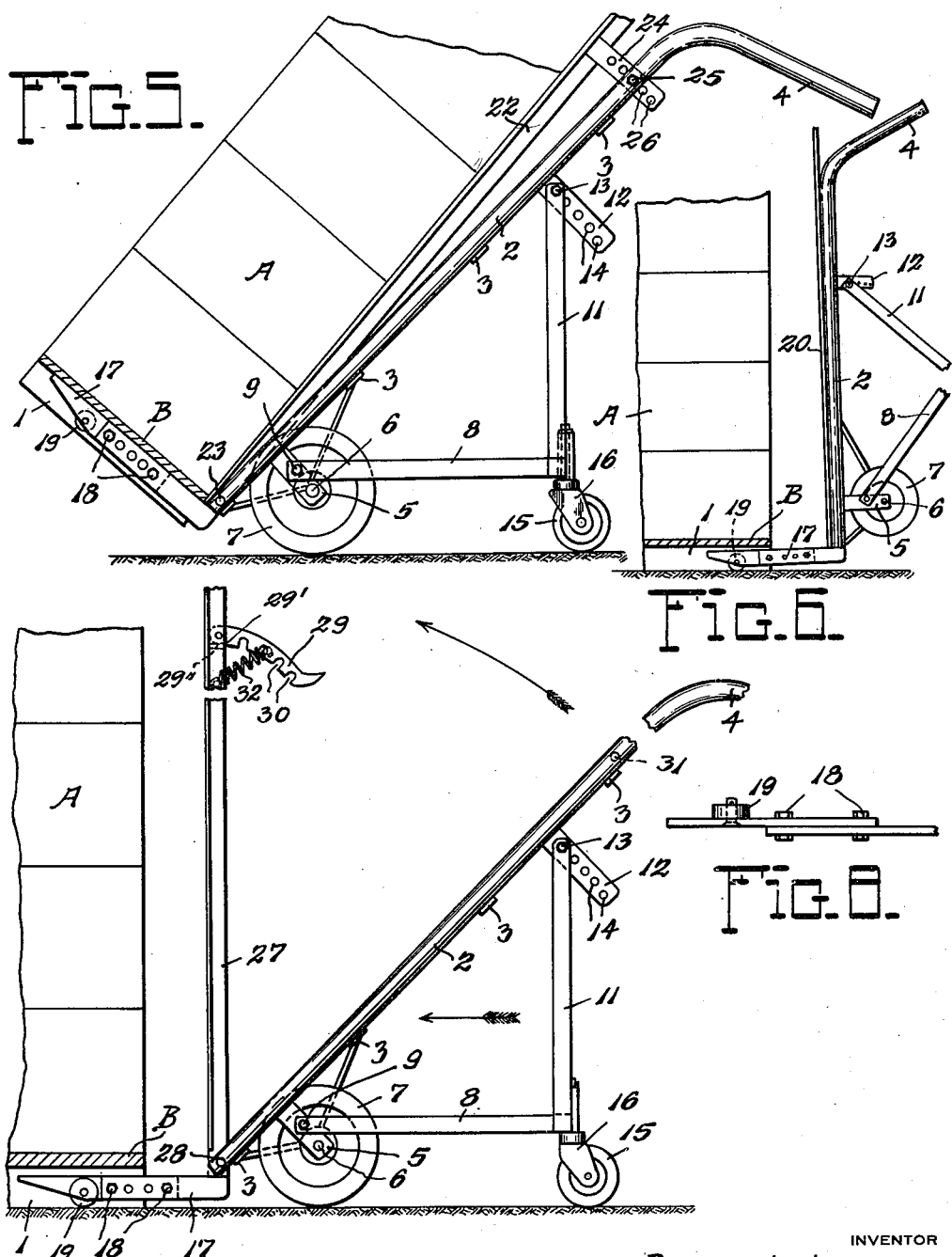
INVENTOR
DUDLEY L. LEA.
BY
Robb & Robb
ATTORNEYS Patented Feb. 18, 1936　　　　　　　　　　　　　　　　　　2,030,925

UNITED STATES PATENT OFFICE 2,030,925

PORTABLE TRUCK

Dudley L. Lea, Findlay, Ohio, assignor to Self Lifting Piano Truck Company, Findlay, Ohio, a corporation Application January 2, 1935, Serial No. 127

7 Claims. (Cl. 280—49)

The present invention appertains to improvements in hand trucks of the type adapted for use in freight houses and many other places where it is desired to move packaged goods such as those packed in cartons. The truck of the invention is designed particularly for use in connection with portable loading platforms which may be disposed on a floor or base of a freight house so that boxes or cartons of goods may be disposed thereon, the platform temporarily supporting these boxes or cartons in stacks. The platform or platforms are made so as to rest in spaced relation to the floor or base and the truck of this invention is designed to be engaged beneath the platform so as to bodily raise the same with its stack of boxes to transfer the weight of the platform and said boxes onto the truck to be wheeled to a suitable place of deposit or to a vehicle or car into which the boxed goods are to be packed for transportation.

Referring more in detail to the features of novelty of the invention, it is notable that I employ a platform engaging or supporting member at the front of the truck equipped with anti-friction rollers for facilitating the movement of said member underneath the loading platform with which it is to be engaged, and which, with the boxes of goods supported thereon, is to be transferred to the truck to be transported by the latter. The said engaging member is of an adjustable construction also, and there is used, as a special feature of the truck structure, a wheel supporting frame having adjustable connection with the main side rails or bars of the truck, whereby adjustability of said frame will accommodate for variation in the balancing of the load upon the wheel frame. Obviously, the boxes or cartons of goods that have to be handled by trucks of this nature are of different weights, and therefore the adjustment of the connection of the wheel frame with the supporting frame of the truck that directly carries the weight of the packaged goods is desirable.

Another feature of novelty of the invention resides in the provision of an adjustable supporting rack carried by the main truck supporting bars or rails which are mounted upon the wheel frame, the adjustability of the supporting rack being availed of additionally as a means for quickly varying the mode of supporting the load in order to readily counterbalance the same upon the wheel frame and thereby take the weight of the load off of the handle bars by which the truck is propelled back and forth.

The preferred embodiments of the invention are more fully described in the following description and are illustrated in the accompanying drawings, in which—

Figure 1 is a side elevation of one form of the invention illustrating the load as when carried by the portable truck ready to be moved to a point of deposit or loading.

Figure 2 is a rear view of the same, looking from about the line 2—2 of Figure 1, parts being omitted.

Figure 3 is a view bringing out more clearly the cast or mountings for the wheel frame and the truss braced construction thereof.

Figure 4 is a fragmentary sectional view taken about on the line 4—4 of Figure 1, looking downwardly, illustrating only one side of the wheel frame structure.

Figure 5 is a view somewhat similar to Figure 1, showing a modification of the invention.

Figure 6 is a fragmentary side view showing somewhat more clearly the mode of interengaging the truck construction of Figure 1 with a loading platform.

Figure 7 is a view illustrating a further modification of the invention wherein the pivoted supporting rack is illustrated as being operable as a lever to facilitate the shifting of the load on a platform to the frame structure of the truck.

Figure 8 is a fragmentary top plan view showing more clearly the manner of mounting the rollers on the platform engaging arms as well as the adjustable construction of these parts.

Similar reference characters denote like parts throughout the drawings, and first referring to the embodiment of my invention found in Figures 1 to 4 and Figures 6 and 8, the particular construction therein will now be set forth. Figure 6 illustrates how a plurality of boxes or cartons A may be arranged in a stack upon a loading platform B. This platform B merely consists of a flat horizontal board or boards spaced from the floor or base on which it rests, by means of supporting cleats 1. The truck of the invention is designed to be engaged beneath the platform B, after which the truck will be shifted after the manner of a lever in order to transfer the weight of the load of the platform B and the superposed cartons or boxes A onto the truck, after which the latter will be wheeled off to the place where the load is to be deposited.

The truck of the invention is of the type generally known as hand trucks, and comprises a main frame largely consisting of the side bars 2 connected by cross pieces 3, seen best in Figure 2. At the upper portions thereof the side bars 2 are curved rearwardly and downwardly to provide handles 4. Near their lower ends the side bars 2 are equipped with wheel supporting arms 5 carrying an axle 6 on which are mounted the larger or main wheels 7 of the truck. A wheel frame is connected to the arms 5 and comprises the substantially horizontal side members 8 pivotally attached at their front ends at 9 to the arms 5 intermediate the ends of the latter. The side members 8 may be connected together by bracing cross members 10. Rigidly secured to and projecting upwardly from the rear ends of the side members 8 of the wheel frame are the vertical side members 11, the upper ends of which are adjustably fastened to adjusting arms 12 by means of fastening bolts or the like designated 13. The arms 12 are provided with a series of corresponding openings 14 through which the fastenings 13 may be received. By fastening the upper ends of the arms 11 to the arms 12 at different ones of the openings 14, variation in the balancing of the load on the wheels 7 and upon caster wheels 15 may be accomplished. The caster wheels 15 seen in Figure 3 may be conventional wheels of this type and are suitably swivelly mounted in sleeve-like members 16 carried by the parts 8 and 11 at about the point of juncture of these parts.

The side bars 2 of the main frame of the truck are preferably made out of tubular material such as pipe lengths, and offstanding from these members at their lower extremities are the platform engaging arms 17. These arms 17 are preferably secured to the members 2 by means of extensions 17a that enter the lower extremities of the bars 2 and the extension may be welded or otherwise fastened to the parts 2 in any substantial manner. The engaging arms 17 comprise upper and lower sections connected together by means of bolts 18 or like fastenings whereby the length of the arms 17 may be altered. The wider the loading platform B the longer the arms 17 should preferably be in order to handle the work, and the adjustment of the arms is readily made by means of the fastenings 18 previously referred to. Since the hand truck of the invention will be used generally in a warehouse equipped with a certain width of loading platforms B—1, it is not necessary to make the adjustment of the arms 17 very frequently in order to shorten or lengthen them.

Now in order to facilitate the movement of the truck in order to engage the arms 17 beneath the platforms B after the manner illustrated in Figure 6, I mount upon the front end portions of the arms small rollers 19, which rollers permit the truck to be tilted forwardly upon the engaging arms 17, so to speak, and while the arms 17 are really directly supported by the rollers 19, the truck may be readily shoved forward so as to cause the arms 17 to travel beneath the platform B until the boxes or cartons A upon the platform abut with a rack 20 which is preferably mounted on the truck and secured thereto by any suitable means in order to afford a fairly broad bearing for the articles which are to be moved about on the truck. The rack 20 is simply made up of a series of longitudinal plates or members 21 joined to cross pieces at the ends of the rack.

Figure 6 excellently illustrates the mode of interengaging the hand truck of the invention with the load by causing the arms 17 to enter the space below the platform B whereupon the platform B and the superposed boxes A will be tilted rearwardly by a tilting backwardly of the hand truck until the load is balanced upon the wheels 7 and 15 as illustrated in Figure 1. Dependent somewhat upon the weight of the goods contained in the boxes A, the wheel frame parts 8, 11, and 15 will be adjusted to the means 12—13.

Now in Figure 5 I have illustrated a modification of the invention. Those parts which are like the construction previously described are similarly designated. In this construction, however, I provide a pivoted rack 22 for direct supporting engagement between the side bars 2 of the truck and the boxes or containers A. The rack 22 is pivoted at its lower end as shown at 23 to the lower ends of the bars 2 and at its upper end the rack is equipped with rearwardly and downwardly inclined adjusting arms 24 adapted to be adjustably secured to the upper ends of the bars 2 by means of fastenings 25 which may pass through the parts 24 and 2, and particularly through different ones of the openings 26 of the parts 24. The employment of the rack 22 affords another facility for nicety of adjustment of parts of the truck for the counterbalancing of its load for movement therewith from one place to another. The arms 17 are carried by the rack 22 in this construction.

I have illustrated in Figure 7 still another modification of the invention. In this figure the parts which are the same as previously described are likewise designated as before. However, according to the construction of Figure 7, the platform engaging arms 17 are not mounted on the side bars 2 of the hand truck but are carried by the rack 27 which constitutes a unit with the arms 17, such unit being pivoted to the lower ends of the bars 2 at the points 28. I provide at the upper end of the rack 27 adjustable locking pawls 29 which are notched at 30 to engage a cross rod 31 connecting the side bars 2 together near the handles 4. Springs 32 tend to pull the pawls 29 downwardly and the rear ends of the pawls are upwardly bent so they will automatically engage with the rod 31 when the rack 27 is pulled rearwardly. The operation of the truck according to the Figure 7 construction is almost obvious. The main frame of the truck with its wheel frame will rest upon the floor or base without requiring tilting. It will be advanced, after the rack 27 has been disposed vertically and the rollers 19 of the arms 17 contact with the floor, until the arms 17 are fully disposed beneath the platform B. Thereupon, the rack 27 may be grasped at the upper end thereof, operated as a lever in a rearward direction, and in this manner the platform B and its load piled thereon will be shifted rearwardly until nicely counterbalanced on the bars 2 and wheel frame features beneath same. When further counterbalanced the pawls 29 will be adjusted to hold the load so counterbalanced and it may be readily wheeled away to the point where it is to be deposited.

However if very heavy loads have to be transported with the truck structure as shown in Figure 7, it will be considerably hard to move the rack 27 toward the members 2 and around pivot 28. In such instance it will be advisable to move the members 2 and the parts carried thereby toward rack 27 until the locking pawls 29 interlock with rod 31 and the load may now be tilted by grasping the handles 4. By operating the truck in this manner it will be found that even heavy loads may be very easily handled.

Referring again to Figure 6, it will be noted that when the truck is held in a position as shown in this figure, the same will have a tendency to roll forward and the members 17 will readily slide underneath the platform B. The said pawls 29 have shoulders 29' near their pivoted portions, which shoulders rest against the cross bar 29" of the rack 27 to limit the downward movement of the pawls under the action of the springs 32.

Having thus described my invention, what I claim as new and desire to secure by Letters Patent of the United States, is—

1. In a hand truck of the class described, in combination, a main frame comprising upwardly and rearwardly inclined side bars, wheel carrying arms projecting downwardly from the side bars near their lower ends, wheels supported on said arms, an adjustable wheel frame pivotally connected at its front portion to said arms adjacent to the said wheels and adjustably connected at its upper portion to the upper portion of said side bars, caster wheels carried by the lower portion of said wheel frame, said wheel frame comprising horizontal members which afford the pivotal connection thereof with the arms carrying the first mentioned wheels, and said wheel frame also including vertical parts rigidly fixed to said horizontal members and which are adjustably connected with the side bars of the main frame to afford connection between the wheel frame and said side bars, attaching means for the caster wheels located at the juncture of said horizontal members, a load supporting rack pivotally mounted on the main frame adjacent the lower end of the latter and including a toe extending at an angle therefrom at the lower end, and adjustable connecting means intermediate the main frame and rack adjacent to the upper ends thereof for adjusting the angular position of the latter with respect to the former.

2. In a hand truck of the class described, in combination, a main frame comprising side bars, a wheel frame supporting the same, a rack mounted on said main frame, pivotal connecting means between the lower portion of the rack and the lower portion of the main frame, platform engaging arms projecting at an angle from said rack and movable therewith, and locking devices intermediate the upper portion of the rack and main frame of the truck for locking the rack in fixed relation to the main frame after said rack and its platform engaging arms have been used as a lever to shift a loaded platform from a floor or the like onto the truck, the said locking devices consisting of pawls pivotally connected with said rack and adapted for adjustable connection with the main frame of the truck, rollers mounted on the engaging arms of the rack and adapted to support said arms by contact with the floor as the truck is moved forwardly to project the arms beneath the platform.

3. In a hand truck of the class described, in combination, a main frame comprising side bars, a wheel frame supporting the same, a rack mounted on said main frame, pivotal connecting means between the lower portion of the rack and the lower portion of the main frame, platform engaging arms projecting at an angle from said rack and movable therewith, and locking devices intermediate the upper portion of the rack and the main frame of the truck for locking the rack in fixed relation to the main frame, said locking devices including separable parts permitting relative pivotal movement between the main frame and rack in taking on and/or depositing a load, and said separable parts being interlockingly interengageable automatically incident to relative pivotal movement between the main frame and rack towards each other.

4. In a hand truck of the class described, in combination, a main frame comprising side bars, a wheel frame supporting the same, a rack mounted on said main frame, pivotal connecting means between the lower portion of the rack and the lower portion of the main frame, platform engaging arms projecting at an angle from said rack and movable therewith, and locking devices intermediate the upper portion of the rack and the main frame of the truck for locking the rack in fixed relation to the main frame, said locking devices including a notched pawl pivotally mounted on the rack, means on the main frame for adjustably engaging in the notches of the pawl, and means for yieldably maintaining the pawl in position for automatically effecting such engagement incident to relative pivotal movement between the main frame and the rack.

5. In a hand truck of the class described, in combination, a main frame comprising side bars, a wheel frame supporting the same, a rack mounted on said main frame, pivotal connecting means between the lower portion of the rack and the lower portion of the main frame, platform engaging arms projecting at an angle from said rack and movable therewith, and locking devices intermediate the upper portion of the rack and the main frame of the truck for locking the rack in fixed relation to the main frame, said locking devices including a notched pawl pivotally mounted on the rack, means on the main frame for adjustably engaging in the notches of the pawl, and means for yieldably maintaining the pawl in position for automatically effecting such engagement incident to relative pivotal movement between the main frame and the rack, said pawl and co-acting engaging means being separable to permit a greater pivotal movement of the rack relatively to the main frame than that afforded by the adjustable interengagement of the pawl and its coacting engaging means aforesaid.

6. In a hand truck of the class described, in combination, a main frame comprising side bars, a wheel frame supporting the same, a rack mounted on said main frame, pivotal connecting means between the lower portion of the rack and the lower portion of the main frame, platform engaging arms projecting at an angle from said rack and movable therewith, and locking devices intermediate the upper portion of the rack and the main frame of the truck for locking the rack in fixed relation to the main frame, said locking devices including a notched pawl pivotally mounted on the rack, means on the main frame for adjustably engaging in the notches of the pawl, and means for yieldably maintaining the pawl in position for automatically effecting such engagement incident to relative pivotal movement between the main frame and the rack, said pawl and coacting engaging means being separable to permit a greater pivotal movement of the rack relatively to the main frame than that afforded by the adjustable interengagement of the pawl and its coacting engaging means aforesaid, and said pawl having an inclined face adapted to initially engage the notch engaging means on the main frame as the main frame and rack are moved relatively towards each other, whereby to position the pawl for engagement of the notches with the notch engaging means upon further movement of the main frame and rack relatively towards each other.

7. In a hand truck of the class described, in combination, a main frame comprising side bars, a wheel frame supporting the same, a rack mounted on said main frame, pivotal connecting means between the lower portion of the rack and the lower portion of the main frame, platform engaging arms projecting at an angle from said rack and movable therewith, and locking devices intermediate the upper portion of the rack and main frame for locking the rack in fixed relation to the main frame, the said locking devices including a pawl pivotally connected with said rack and adapted for adjustable connection with the main frame.

DUDLEY L. LEA.